United States Patent
Herzog et al.

(10) Patent No.: US 11,441,095 B2
(45) Date of Patent: Sep. 13, 2022

(54) USE OF POLYMERIC ADDITIVES FOR PARAFFIN-CONTAINING FLUIDS

(71) Applicant: Sasol Performance Chemicals GmbH, Hamburg (DE)

(72) Inventors: Oliver Herzog, Brunsbuttel (DE); Sabine Scherf, Itzehoe (DE); Michael Ruffmann, Averlak (DE); Wolfgang Breuer, Dorsten (DE)

(73) Assignee: Sasol Chemicals GmbH, Hamburg (DE)

( * ) Notice: Subject to any disclaimer, the term of this patent is extended or adjusted under 35 U.S.C. 154(b) by 43 days.

(21) Appl. No.: 15/747,061

(22) PCT Filed: Jul. 22, 2016

(86) PCT No.: PCT/EP2016/001276
§ 371 (c)(1),
(2) Date: Jan. 23, 2018

(87) PCT Pub. No.: WO2017/012716
PCT Pub. Date: Jan. 26, 2017

(65) Prior Publication Data
US 2018/0371353 A1    Dec. 27, 2018

(30) Foreign Application Priority Data
Jul. 23, 2015   (EP) ..................................... 15178148

(51) Int. Cl.
| C10M 145/16 | (2006.01) |
| C08F 212/08 | (2006.01) |
| C08F 222/14 | (2006.01) |
| C10N 30/02  | (2006.01) |

(52) U.S. Cl.
CPC ......... *C10M 145/16* (2013.01); *C08F 212/08* (2013.01); *C08F 222/14* (2013.01); *C10M 2209/086* (2013.01); *C10N 2030/02* (2013.01)

(58) Field of Classification Search
CPC ........... C10M 145/16; C10M 2209/086; C08F 212/08; C08F 222/14; C10N 2230/02; C10N 2030/02
See application file for complete search history.

(56) References Cited

U.S. PATENT DOCUMENTS

| 2,570,846 A   | 10/1951 | Otto et al. |
| 3,574,575 A   | 4/1971  | Gee et al. |
| 4,608,411 A * | 8/1986  | Meunier ............... C08F 255/02 524/531 |
| 5,703,025 A   | 12/1997 | Srinivasan |
| 2009/0312210 A1 | 12/2009 | Grisso |
| 2013/0005628 A1 | 1/2013  | Visger et al. |

FOREIGN PATENT DOCUMENTS

| GB | 1172950  | 12/1969 |
| WO | 94/00535 | 1/1994 |

OTHER PUBLICATIONS

Al-Sabagh, et al., "Styrene-maleic anhydride copolymer esters as flow improvers of waxy crude oil" J of Pet Sci and Eng., vol. 65, No. 3-4, Apr. 1, 2009, pp. 139-146.

* cited by examiner

*Primary Examiner* — Vishal V Vasisth
(74) *Attorney, Agent, or Firm* — Bushman Werner, P.C.

(57) ABSTRACT

The present invention is concerned with the use of polymeric additives for paraffin-containing fluids as pour point depressants and low temperature flow improvers, wherein the polymers comprise styrene and maleic acid dialkyl ester building blocks.

9 Claims, 3 Drawing Sheets

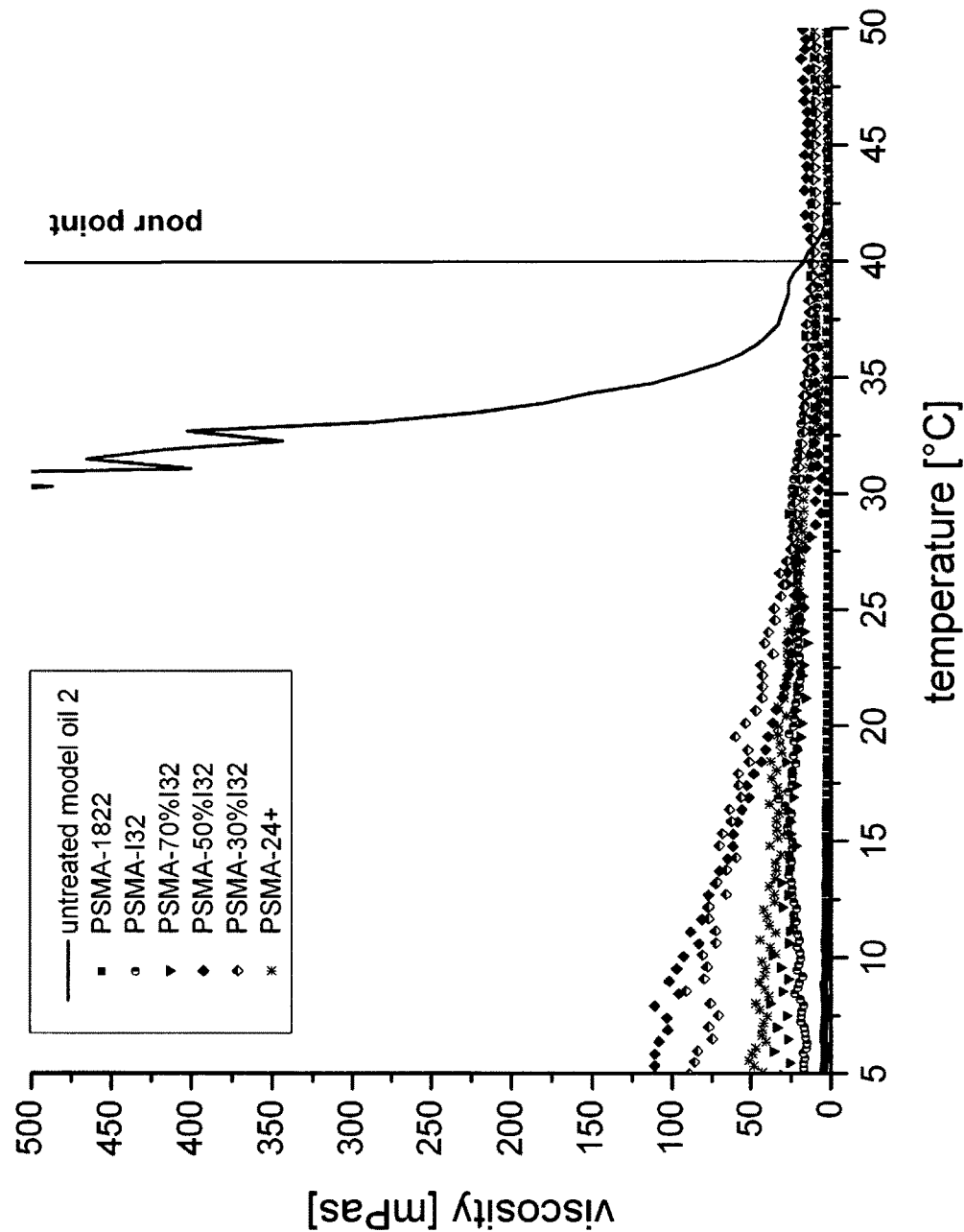

USE OF POLYMERIC ADDITIVES FOR PARAFFIN-CONTAINING FLUIDS

This application is a national phase application of PCT/EP2016/001276, filed Jul. 22, 2016, which claims priority to EP 15178148.1, filed Jul. 23, 2015, the disclosures of which are incorporated herein by reference for all purposes.

The present invention relates to the use of polymeric additives in paraffin-containing fluids as pour point depressants and/or low temperature flow improvers, the polymeric additives comprising styrene and maleic acid dialkyl ester building blocks, and to a method of reducing the pour point and improving the low temperature flow properties of improvers of paraffin-containing fluids. According to another aspect the polymeric additives are used in a method for reducing the pour point and/or for improving the cold flow properties of a paraffin-containing fluid.

The lowest temperature at which fluids still can flow is generally known as the pour point. If for example the crude oil temperature reaches the wax appearing temperature (WAT) or will fall below such temperature, wax crystals can precipitate in the solution, which may cause the plugging of lines and equipment with accompanied severe operational problems. These problems have to be addressed in an efficient manner for crude oil production. Various pour point depressants and flow improvers have been developed to be added in low concentrations to crude oil compositions, in order to affect the wax crystal growth and thereby improving the flow properties of the crude oil. Pour point depressants are usually structured in that parts of the molecules are interacting with the paraffin wax crystals, and would co-crystallize with the paraffin waxes. Other objects of pour point depressants are reducing the cohesive forces between the wax crystals and preventing the growth of the wax matrices.

A number of compounds have proved to be efficient pour point depressants and flow improvers. For example, copolymers produced by reacting cyclic amides such as vinylpyrrolidone with long carbon chain alpha-olefin monomers have proved to be efficient pour point depressants. Other examples include polyalkylmethacrylate esters that have been prepared by the transesterification of polymethylacrylate and linear long chain alcohols (US 2011/0190438).

Polystyrene-maleic anhydride copolymer (PSMA) has also widely been used as a pour point depressant because of its good properties and low cost. PSMA is basically oil insoluble. Esterification of PSMA with long chain linear fatty alcohols produces compounds that are oil soluble.

In addition, these compounds may have surfactant properties (i.e. contain a polar hydrophilic group and a hydrophobic group). [Al-Sabagh A. M. et al, *Journal of Petroleum Science and Engineering* 65 (2009) 139-146]. U.S. Pat. No. 3,574,575 describes the synthesis of styrene-maleic anhydride copolymer esters that can be used as fluidity improvers in liquid hydrocarbon oil compositions.

The specification outlines the synthesis of esters using linear alcohols of different carbon chain lengths (typically from 20 to 24 carbon atoms in the alkyl portion). The esters are added to crude oils in varying amounts between 50 to 10000 ppm, by weight, in order to prove efficacy. Pour points were typically lowered by 25° C., depending on the combination of the specific pour point depressants (PPDs) and the oil composition used to demonstrate increased fluidity.

Styrene-maleic acid alkyl ester polymers having branched and linear alkyl groups are already known form US 2009/0312210 A1 and U.S. Pat. No. 5,703,023. But these references cannot suggest the use of the polymeric additives as pour point depressants and/or low temperature flow improvers.

It is known from the prior art that incorporating branched alkyl moieties into the polymer backbone of the pour point depressant, provided very poor, if any, pour point depressing and wax inhibition effects when compared to the usage of only linear carbon chains.

There exists a continuing need to develop further point depressants and wax inhibitors for the treatment of various paraffinic fluids and oilfield operations especially when looking into the development of new oilfields with heavier crude oils.

SUMMARY OF THE INVENTION

The object of the present invention is to provide a polymeric additive for use as a wax inhibitor and pour point depressant, and at the same time improving cold flow properties. In particular, this invention relates to the use of styrene-maleic acid dialkyl ester polymers. More particularly, the invention relates to the use of styrene-maleic acid alkyl ester copolymers, where the ester groups are made from mixtures of long-chain linear and branched fatty alcohols. The styrene-maleic acid alkyl ester polymer comprises the following building blocks:

[1]

a)

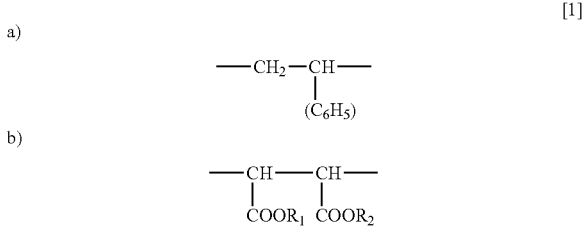

b)

wherein $R_1$, $-R_2=$ are independent from each other a C10- to C50-alkyl group;

the alkyl group being branched or linear, the ratio of the linear alkyl groups to the branched alkyl groups is in the range from 95:5 to 5:95 (weight %), preferably 10:90 to 90:10, most preferably from 20:80 to 80:20, at least 90% by the number, preferably more than 98% by the number, of the building blocks are a) and b), relative to the total number of all building blocks incorporated into the polymer; and the building blocks a) and b) are present in the polymer in a (number) ratio of from 80:20 to 20:80, relative to each other, or according to preferred embodiments 75:25 to 50:50, preferably 60:40 to 50:50.

The branched alkyl groups are preferably 2-alkyl-1-alkyl groups and also independent thereof the alkyl groups preferably comprise 12 to 36 carbon atoms.

The polymer preferably has an acid value of less than 2 mg KOH/g, measured according to DIN EN 14104.

The polymer chain may best comprise in total 50 to 150 building blocks a) and b) per polymer chain.

According to another aspect the polymers defined above are used in a method for reducing the pour point and/or to for improving the cold flow properties of a paraffin-containing fluid.

The polymer is not a singular compound but a mixture of compounds and in so far above values refer to a mixture of compounds or in other words a composition of polymers all defined by above values.

The polymer may comprise buildings blocks other than a) or b), for example maleic acid anhydride, or maleic acid mono-esters.

It was surprisingly found that mixtures of styrene-maleic acid alkyl esters, where the ester groups are made of mixtures of linear and branched fatty alcohols, result in a marked improvement relating to the reduction of pour points and wax inhibition, as well as low temperature viscosity properties, when added to various types of paraffin-containing fluids, more particularly high molecular weight oils. These mixtures showed significant improved performance when compared to either styrene-maleic anhydride copolymer esters produced from only branched fatty alcohols, or esters with alkyl chains made from only linear fatty alcohols.

Typical examples of the paraffin-containing fluid are synthetic oils, crude oils, petroleum oils, shale oils or a tar sands oil, as well as mixtures thereof. The "paraffin containing Fluids" that are of particular interest in the present invention may be further characterised by one or more of the following properties:

carbon number range C15-C80;

pour points between 20° C. to 80° C.;

80-95% (weight) n-paraffins balance being i-paraffins and/or cyclo-paraffins;

average carbon numbers ranging between C20-C50.

20 to 4000 ppm (weight:weight) of the polymers may be used in the paraffin-containing fluid, or according to a preferred embodiment 100 ppm to 2000 ppm; preferably 300 ppm to 1200 ppm (weight:weight) of the polymers.

The polymer may also be used added being part of a liquid composition comprising (A) 1 to 50 wt. % of the polymers as defined t any one of claims 1 to 8 dissolved in (B) 99 to 50 wt. % of an aromatic solvent, preferably xylene, toluene, benzene or mixtures thereof, each relative to the total weight of (A) and (B).

In the spirit of this invention, it should be appreciated that, given the vast array of different types of paraffin-containing fluids that can benefit from improved low temperature viscosity properties and lower pour points, an additive providing optimum benefits for a specific paraffin-containing fluid can be selected following the teaching of the claims. Other aspects and advantages of the invention are described in the subordinate claims or hereinbelow.

BRIEF DESCRIPTION OF DRAWINGS

FIG. 3 depicts the effect of selected flow improvers on the viscosity of Model Oil 2 at various temperatures.

DETAILED DESCRIPTION

Figure 1:
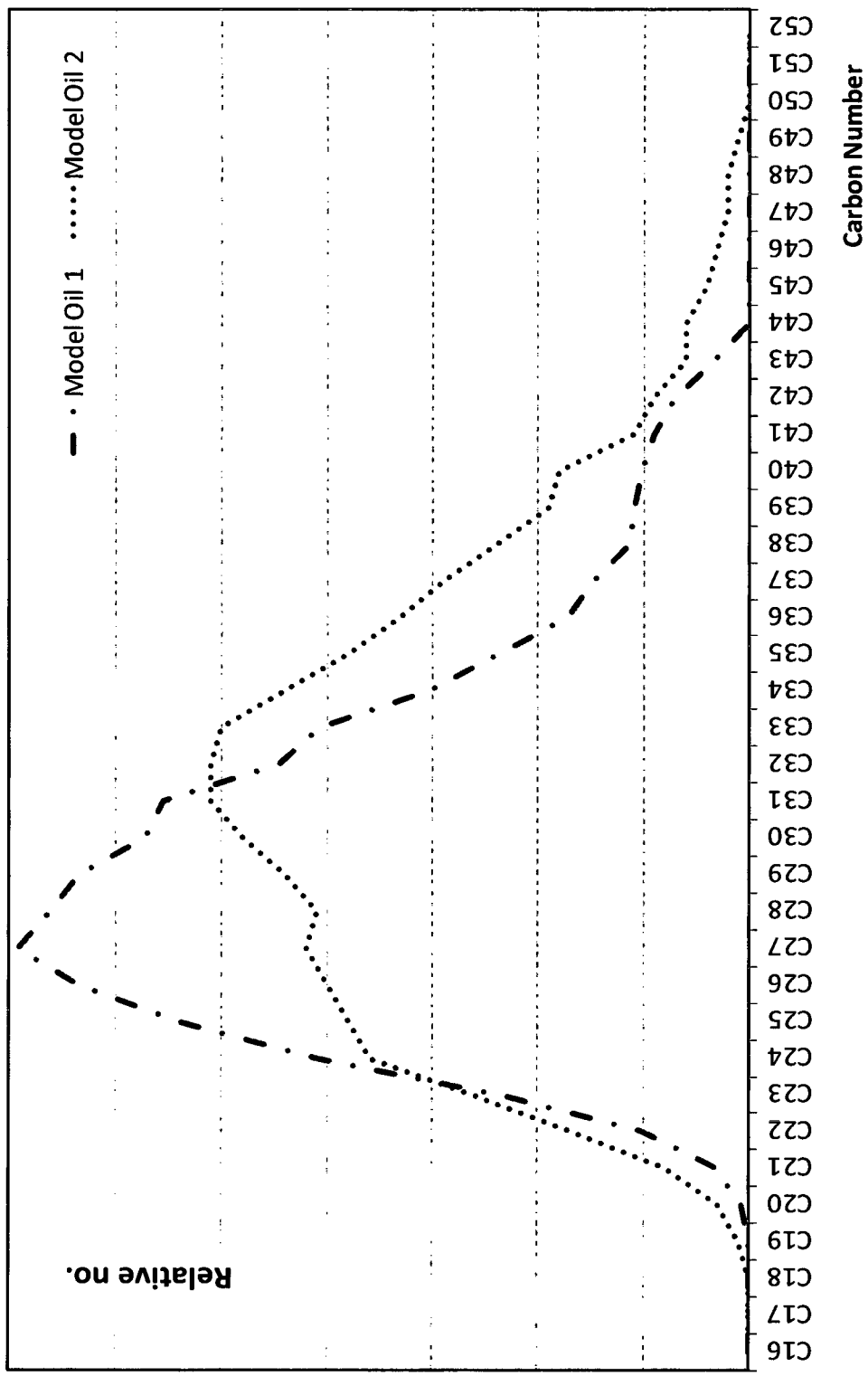
FIG. 1 depicts the carbon number distribution of two model oils.

The invention makes use of novel styrene-maleic acid alkyl ester polymers having the following building block:

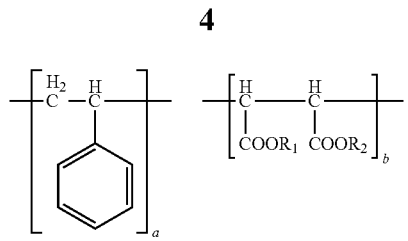

with $R_1$ and $R_2$=alkyl, without that the sequence of building blocks resulting from styrene a) and maleic acid dialkyl ester b) necessarily need to be of an alternating nature (a)b) a)b) a)b) . . . ). The building blocks can also have a random distribution or a block structure.

The following examples and results will illustrate the preparation of the polymeric additives and will clearly demonstrate the advantages obtained. However, it should be understood that the invention is not limited to these particular polymeric alkyl ester compounds.

The two reaction schemes below illustrate the synthesis of styrene-maleic acid dialkyl ester polymers with an alternating structure. However, the product can also be synthesised via alternative synthetic pathways (such as performing the esterification of maleic anhydride before copolymerising with styrene).

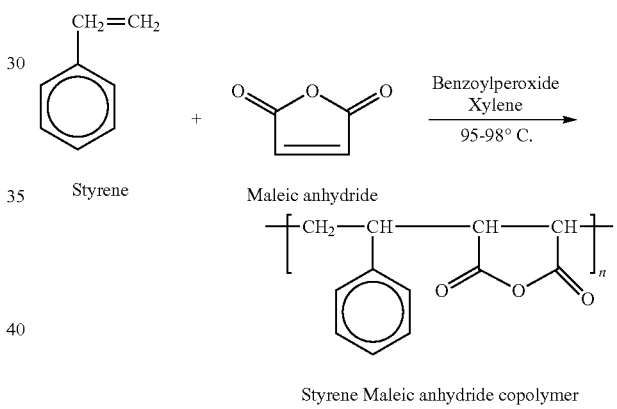

The styrene-maleic anhydride copolymer is then esterified as follows:

Experimental Section

The following general preparation method was followed:

Maleic anhydride (from Merck and used as received) and xylene were charged to the reactor and heated up to 95° C.

under nitrogen. Styrene (from Merck and used as received) and the initiator benzoylperoxide, dissolved in xylene were simultaneously added dropwise over a period of 90-120 min into the reactor. The polymerisation was carried out for 6-8 hours at 95-98° C.

The completion of the esterification to the desired level was measured by the acid number of the unreacted maleic anhydride in the filtered polymerisation solution. The acid value should be less than 2 mg KOH/g. The copolymer molecular weight was determined by using intrinsic viscosity measurements and GPC analysis (MZ-Gel SDplus 100 Å 5 μm 300×8 mm/MZ-Gel SDplus 1000 Å 5 μm 300×8 mm/Agilent polyPore 5 μm 300×7.5 mm equipped with a pre-column Mz-Gel SDplus linear 5 μm 50×8 mm, injection volume 20 μL, solvent THF, flow rate 1 mL/min, detection via UV (254 nm) and refractive index).

The intrinsic viscosity value of the copolymer (composition) was around 0.23 dL/g representing a mass average molecular weight Mw of around 15000 g/mol.

The esterification reaction took place in the same reactor. Fatty alcohol was charged to the copolymer/xylene suspension and heated up until the suspension turned into a clear solution.

Methane sulfonic acid was charged as catalyst and the reactor was heated up until the reflux of xylene started. The esterification reaction was carried out until the theoretical amount of water was collected. The final product for application contained around 40 wt. % alcohol copolymer ester in xylene.

The specific fatty alcohols that were used for preparation of the polymeric additives are described in Table 1:

the general synthesis procedure as set out previously. The acronyms for the different flow improvers prepared are described below:

Characterisation of the flow improvers evaluated:

PSMA-N1822 The alcohol NAFOL 1822 was used to esterify the styrene-maleic anhydride copolymer.

PSMA-24+: The alcohol NAFOL 24+ was used to esterify the styrene-maleic anhydride copolymer.

PSMA-I12 The alcohol ISOFOL 12 was used to esterify the styrene-maleic anhydride copolymer.

PSMA-I24 The alcohol ISOFOL 24 was used to esterify the styrene-maleic anhydride copolymer.

PSMA-I32 The alcohol ISOFOL 32 was used to esterify the styrene-maleic anhydride copolymer.

PSMA-70% I12 A mixture of alcohols were used to esterify the styrene-maleic anhydride copolymer: 70 weight % ISOFOL 12 and 30 weight % NAFOL 24+

PSMA-50% I12 A mixture of alcohols were used to esterify the styrene-maleic anhydride copolymer: 50 weight % ISOFOL 12 and 50 weight % NAFOL 24+.

PSMA-30% I12 A mixture of alcohols were used to esterify the styrene-maleic anhydride copolymer: 30 weight % ISOFOL 12 and 70 weight % NAFOL 24+.

PSMA-70% I24 A mixture of alcohols were used to esterify the styrene-maleic anhydride copolymer: 70 weight % ISOFOL 24 and 30 weight % NAFOL 24+.

PSMA-50% I24 A mixture of alcohols were used to esterify the styrene-maleic anhydride copolymer: 50 weight % ISOFOL 24 and 50 weight % NAFOL 24+.

PSMA-30% I24 A mixture of alcohols were used to esterify the styrene-maleic anhydride copolymer: 30 weight % ISOFOL 24 and 70 weight % NAFOL 24+.

TABLE 1

Typical analysis of long chain fatty alcohols used for preparation of the styrene-maleic copolymer esters:

| Chemical description | ISOFOL ® 12 2-butyl-octanol | ISOFOL ® 24 2-decyl-tetradecanol | ISOFOL ® 32 2-tetradecyl-octdecanol | NAFOL ® 24+ Alcohols, C20-22 | NAFOL ® 1822 Alcohol blend C18-22 |
|---|---|---|---|---|---|
| C12 OH | 97 min. | | | | |
| C16 OH | | | | | 1 max. |
| C18 OH | | | | | 41-45 |
| C20 OH | | | | | 9-13 |
| C22 OH | | | | 10 max. | 42-46 |
| C24 OH | | 97 min. | | 15-30 | 1 max. |
| C26 OH | | | | 15-30 | |
| C28 OH | | | | 15-30 | |
| C30 OH | | | | 5-20 | |
| C32 OH | | | 80 min. | 15 max. | |
| C34 OH | | | | 10 max. | |
| C36 OH | | | | 15 max. | |
| Average molecular weight [g/mol] | 186 | 354 | 470 | 408 | 302 |

ISOFOL® alcohols are branched Guerbet alcohols, more specifically, saturated primary alcohols with defined branching at the two position of the carbon chain. The Guerbet alcohols can chemically be described as 2-alkyl-1-alkanols.

NAFOL® 24+ refers to a C24 synthetic linear alcohol mixture.

NAFOL® 1822 refers to a C18-22 synthetic linear alcohol mixture.

The no. of carbon atoms given above refers to the complete molecule and not only to the backbone.

Twenty six different polymeric additives were prepared using various fatty acids as described above, according to PSMA-70% I32 A mixture of alcohols were used to esterify the styrene-maleic anhydride copolymer: 70 weight % ISOFOL 32 and 30 weight % NAFOL 24+.

PSMA-50% I32 A mixture of alcohols were used to esterify the styrene-maleic anhydride copolymer: 50 weight % ISOFOL 32 and 50 weight % NAFOL 24+.

PSMA-30% I32 A mixture of alcohols were used to esterify the styrene-maleic anhydride copolymer: 30 weight % ISOFOL 32 and 70 weight % NAFOL 24+.

PSMA-70% I32/30% N1822 A mixture of alcohols were used to esterify the styrene-maleic anhydride copolymer: 70 weight % ISOFOL 32 and 30 weight % NAFOL 1822.

PSMA-50% I32/50% N1822 A mixture of alcohols were used to esterify the styrene-maleic anhydride copolymer: 50 weight % ISOFOL 32 and 50 weight % NAFOL 1822.

PSMA-30% I32/70% N1822 A mixture of alcohols were used to esterify the styrene-maleic anhydride copolymer: 30 weight % ISOFOL 32 and 70 weight % NAFOL 1822.

PSMA-70% I32 blend The styrene-maleic anhydride copolymer ester contained a mixture of 70 weight % PSMA-I32 and 30 weight % PSMA-24+.

PSMA-50% I32 blend The styrene-maleic anhydride copolymer ester contained a mixture of 50 weight % PSMA-I32 and 50 weight % PSMA-24+.

PSMA-30% I32 blend The styrene-maleic anhydride copolymer ester contained a mixture of 30 weight % PSMA-I32 and 70 weight % PSMA-24+.

COMM-N1822 The alcohol used to esterify the styrene-maleic anhydride copolymer was NAFOL 1822.

COMM-I32 The alcohol used to esterify the styrene-maleic anhydride copolymer was ISOFOL 32.

COMM-24+: The alcohol used to esterify the styrene-maleic anhydride copolymer was NAFOL 24+

COMM-70% I32 The styrene-maleic anhydride copolymer ester contained 70 weight % PSMA-I32 and 30% PSMA-24+.

COMM-50% I32 The styrene-maleic anhydride copolymer ester contained 50 weight % PSMA-I32 and 50 weight % PSMA-24+.

COMM-30% I32 The styrene-maleic anhydride copolymer ester contained 30% PSMA-I32 and 70% PSMA-24+.

PSMA=Styrene-maleic anhydride copolymer containing 50 mol % maleic acid di alkyl ester COMM=Styrene-maleic anhydride copolymer containing 33 mol % maleic acid di alkyl ester, as starting material for the esterification Xiran® (from Polyscope used as received), acid value=373 mg KOH/g was used.

The table below describes selected properties of the synthesised flow improvers:

TABLE 2

Selected properties of the flow improvers evaluated

|  | PSMA-N1822 | PSMA-24+ | COMM-N1822 | COMM-24+ |
|---|---|---|---|---|
| Pour point [° C.] | 8 | 26 | 2 | 23 |
| Viscosity [mPas] | 55@20° C. | 24@40° C. | 52@20° C. | 29@40° C. |
| Acid value [mgKOH/g] | 5.4 | 9.5 | 5.3 | 3.0 |
| % esterified COOH | 99.0 | 98.3 | 98.6 | 99.2 |

|  | PSMA-I32 | PSMA-70% I32 | PSMA-50% I32 | PSMA-30% I32 |
|---|---|---|---|---|
| Pourpoint [° C.] | −24 | −9 | 4 | 14 |
| Viscosity [mPas] | 41@20° C. | 78@20° C. | 46@20° C. | 66@20° C. |
| Acid value [mgKOH/g] | 1.9 | 6.7 | 6.0 | 3.4 |
| % esterified COOH | 99.7 | 98.8 | 98.9 | 99.4 |

|  | PSMA-I24 | PSMA-70% I24 | PSMA-50% I24 | PSMA-30% I24 |
|---|---|---|---|---|
| Pourpoint [° C.] | −40 | −40 | 5 | 16 |
| Viscosity [mPas] | 43@20° C. | 36@20° C. | 45@20° C. | 70@20° C. |
| Acid value [mgKOH/g] | 5.6 | 6.7 | 4.8 | 9.1 |
| % esterified COOH | 99.0 | 98.8 | 99.1 | 98.4 |

|  | PSMA-I12 | PSMA-70% I12 | PSMA-50% I12 | PSMA-30% I12 |
|---|---|---|---|---|
| Pourpoint [° C.] | −40 | −12 | 14 | 21 |
| Viscosity [mPas] | no data | 46@20° C. | 62@20° C. | 57@20° C. |
| Acid value [mgKOH/g] | 9.7 | 4.1 | 3.5 | 7.2 |
| % esterified COOH | 98.3 | 99.3 | 99.4 | 98.7 |

|  | PSMA-70% I32/30% N1822 | PSMA-50% I32/50% N1822 | PSMA-30% I32/70% N1822 |
|---|---|---|---|
| Pourpoint [° C.] | −16 | −10 | −2 |
| Viscosity [mPas] | 46@20° C. | 55@20° C. | 77@20° C. |
| Acid value [mgKOH/g] | 2.9 | 2.7 | 5.2 |
| % esterified COOH | 99.5 | 99.5 | 99.1 |

|  | COMM-I32 | COMM-70% I32 | COMM-50% I32 | COMM-30% I32 |
|---|---|---|---|---|
| Pourpoint [° C.] | −28 | −17 | −5 | 8 |
| Viscosity [mPas] | 53@20° C. | 45@20° C. | 16@40° C. | 29@40° C. |
| Acid value [mgKOH/g] | 2.9 | 1.5 | 6.7 | 2.2 |
| % esterified COOH | 99.2 | 99.6 | 98.2 | 99.4 |

|  | PSMA-70% I32 blend | PSMA-50% I32 blend | PSMA-30% I32 blend |
|---|---|---|---|
| Pourpoint [° C.] | 24 | 24 | 26 |

Evaluation Tests:

Two model oils were prepared to mimic crude oils with high paraffinic content and different carbon number distributions of the n-alkanes.

The model oils were made up by mixing 14 wt. % synthetic paraffin waxes in n-decane. Table 3 describes selected properties of the model oils, and FIG. 1 illustrates the carbon number distribution of Model Oil 1 and Model Oil 2 used in the evaluation.

TABLE 3

Selected properties of the added synthetic paraffins for the model oils

|  | For Model Oil 1 | For Model Oil 2 |
|---|---|---|
| Synthetic paraffins | Sasolwax 5803/5805 (1:1) | Sasolwax 6805 |
| Average molecular weight of the Synthetic Paraffin | 418 g/mol | 440 g/mol |
| Average carbon number of the Synthetic Paraffin | 30 | 31 |
| Model oil Pourpoint | 30° C. | 40° C. |

The various flow improvers were added to the two model oils in quantities of 200 ppm and 400 ppm of polymer. The polymer was added as a 40 wt. % solution in xylene. For each case the pour point as well as the viscosity of the mixture was determined.

Pour Point Measurements:

The pour point (no-flow point) is the lowest temperature at which a crude oil stays fluid when it has been cooled down under static conditions.

Measurement Method According to ASTM D5985:

According to measurement method ASTM D5985 (Standard Test Method for Pour Point of Petroleum Products (Rotational Method)) the sample cup is filled with the crude oil, then the cup is set to a slow rotation of about 0.1 rounds per minute. The coaxial, tiltable bedded temperature sensor is dipping into the sample fluid. When the pour point is reached the viscosity of the sample increases and by this the temperature sensor is moved out of its position and triggers the light barrier.

Viscosity Measurements:

High molecular weight straight chain alkanes in waxy crude oils play a significant role on the flow behavior of crudes at decreasing temperatures.

If temperature drops, the solubility of paraffins in crude oil decreases drastically. Paraffin precipitates out, and finally deposits on cold surfaces like pipeline walls. The deposit formed on the cold surface has a gel-like network of solid wax crystals trapping the bulk oil in the network.

Under quiescent conditions (e.g. pipelines undergoing a planned or unplanned shut-down) crude oil starts to gel and may become a solid-like gel if the oil is continuously being cooled down below its pour point and/or maintained at ambient temperatures below the pour point. The gelling of the oil significantly increases the fluid viscosity and by increasing the wax content of this wax-oil gel with time, the gel-strength also increases.

If the strength of the gel becomes too high, then a shut-down pipeline may not be restarted because too high restart pressure has to be applied and/or wax removal methods like mechanical pigging may not be a viable option. It is therefore desired to have a softer wax deposition.

Pour Point Depressants (PPD) are added and flow improver testing is used to evaluate the PPD's ability to keep paraffinic oil fluid and to reduce the strength of gelled crude.

Static Viscosity Measurement to Simulate the Conditions of a Shut-in Pipeline:

All measurements were carried out with a Haake RheoStress 6000 Rotational Rheometer.

Temperature Dependant Viscosity

| Geometry: | cone/plate | Sensor: | C35/2° |
|---|---|---|---|
| Slit: | 0.1 mm | Cooling Rate: | 1° C./min |
| Shear Rate: | 6 s$^{-1}$ | | |

The following specific experiments were carried out to demonstrate the invention:

TABLE 4

Pour point reduction observed for the various flow improvers evaluated: varying the branched/linear structure of the alkyl chains within the polymeric alkyl esters

| POUR POINT DEPRESSANT (PPD) | Reduction in Pour Point (° C.) 200 ppm PPD added | Reduction in Pour Point (° C.) 400 ppm PPD added |
|---|---|---|
| PSMA - I12* | 1 | 2 |
| PSMA - 70% I12 | 8 | 10 |
| PSMA - 50% I12 | 11 | 14 |
| PSMA - 30% I12 | 10 | 12 |
| PSMA - I24* | 2 | 1 |
| PSMA - 70% I24 | 10 | 16 |
| PSMA - 50% I24 | 9 | 15 |
| PSMA - 30% I24 | 11 | 15 |
| PSMA - I32* | 2 | 2 |
| PSMA - 70% I32 | 11 | 16 |
| PSMA - 50% I32 | 12 | 18 |
| PSMA - 30% I32 | 11 | 15 |
| PSMA - 24+** | 7 | 8 |
| PSMA - 1822** | 12 | 14 |

PSMA = Styrene-maleic anhydride copolymer containing 50 mol % maleic anhydride
*Polymeric alkyl esters containing mainly branched alkyl chains (see characterization of flow improvers evaluated above)
**Polymeric alkyl esters containing mainly linear alkyl chains (see characterization of flow improvers evaluated above)

Example 1

In order to determine whether the structure of the alkyl chains (whether branched, linear or a mixture of branched and linear chains) incorporated in the polymeric alkyl esters affect the ability of the additives to lower the pour point of paraffinic fluids, additives were prepared according to the general method described above. The esters were added to Model Oil 1 in both 200 and 400 ppm polymer quantities (the polymer was added as a 40 wt. % solution in xylene), and their ability to reduce the pour point of the oil was determined. Results are shown in Table 4.

The results in table 4 show that PPDs with mixed (linear and branched) alkyl esters (PSMA-70% I32, PSMA-50% I32 and PSMA-30% I32) show significantly higher pour point reduction values in Model Oil 1 than PPDs with either only branched alkyl chains (PSMA-I32) or only linear alkyl chains (PSMA-24+). For Model Oil 1 the 50% mixture of branched ester groups (PSMA-50% I32) delivered the best results.

Figure 2:
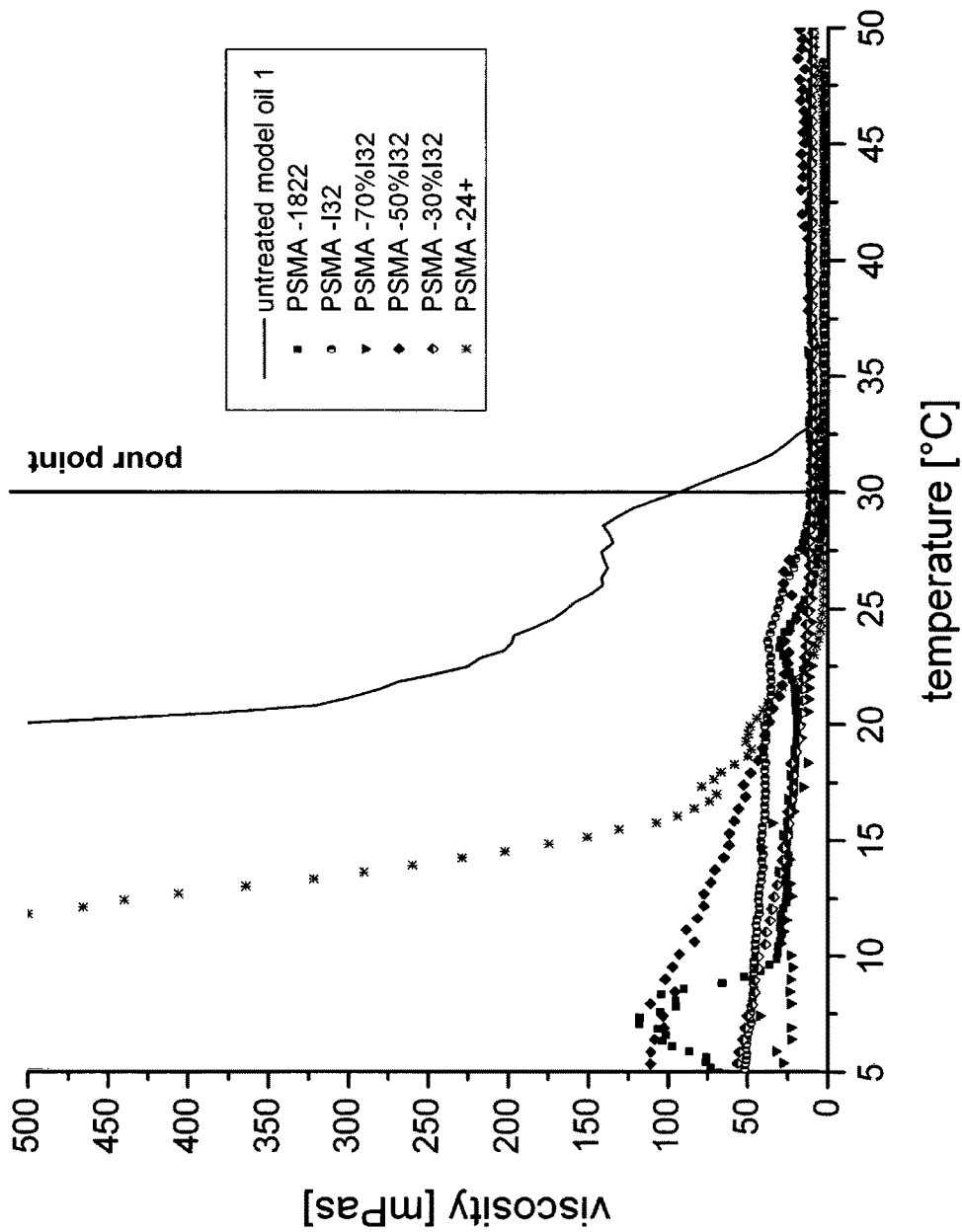
FIG. 2 depicts the effect of selected flow improvers on the viscosity of Model Oil 1 at various temperatures.

FIG. 2 shows the effect of selected flow improvers on the viscosity of Model Oil 1 at various temperatures (200 ppm additive added):

The addition of the branched alkyl chain styrene-maleic acid dialkyl ester copolymer (PSMA-I32) to the Model Oil 1, whether as mixtures with the linear alkyl chain ester PSMA-24+(i.e. PSMA-70% I32, PSMA-50% I32 and PSMA-30% I32) or on its own, showed low viscosities for the specific model oil tested over a wide temperature range. In contrast the addition of the polymer containing esters with linear alkyl chains only (PSMA-24+) did not lower the viscosity of the oil at the given temperatures.

Example 2

To compare the effect of the length and the relative amount of the linear alkyl ester groups in mixtures of styrene-maleic acid esters with linear and branched alkyl groups, the following mixtures of alcohols were prepared:
A mixture of 70 weight % ISOFOL32/30 weight % NAFOL 24+
A mixture of 70 weight % ISOFOL32/30 weight % NAFOL1822
A mixture of 50 weight % ISOFOL32/50 weight % NAFOL24+
A mixture of 50 weight % ISOFOL32/50 weight % NAFOL1822
A mixture of 30 weight % ISOFOL32/70 weight % NAFOL24+
A mixture of 30 weight % ISOFOL32/70 weight % NAFOL1822

These different mixtures were used to synthesise polymeric additives according to the general method as described above. Each compound was added in 200 and 400 ppm polymer quantities (the polymer was added as a 40 wt. % solution in xylene) to Model Oil 1, and the pour point reduction was recorded. Results are shown in Table 5.

TABLE 5

Pour point reduction observed for the various flow improvers evaluated: varying the structure of the alkyl chains within the polymeric alkyl esters

| POUR POINT DEPRESSANT (PPD) | Reduction in Pour Point (° C.) 200 ppm PPD added | Reduction in Pour Point (° C.) 400 ppm PPD added |
|---|---|---|
| PSMA-I32 | 2 | 2 |
| PSMA-70% I32/ 30% N1822 | 17 | 24 |
| PSMA-50% I32/ 50% N1822 | 30 | 38 |
| PSMA-30% I32/ 70% N1822 | 38 | 48 |
| PSMA-N1822 | 12 | 14 |
| PSMA-I32 | 2 | 2 |
| PSMA-70% I32/ 30% 24+ | 11 | 16 |
| PSMA-50% I32/ 50% 24+ | 12 | 18 |
| PSMA-30% I32/ 70% 24+ | 11 | 15 |
| PSMA-24+ | 7 | 8 |

The results above show a significant improvement in pour point reduction when mixing ISOFOL 32 with NAFOL 1822 to obtain an alcohol blend for esterification of the polymeric compound.

Example 3

In order to determine whether the ratio between styrene and maleic anhydride in the polymeric backbone of the ester, plays a role in the ability of the ester to lower the pour point of the paraffinic oil, polymeric alkyl esters were prepared according to the general method described above. The molar ratio of styrene:maleic anhydride was varied between 50:50 and 67:33. The esters were added to Model Oil 1 in both 200 and 400 ppm polymer quantities (the polymer was added as a 40 wt. % solution in xylene), and their ability to reduce the pour point of the oil was determined. Results are shown in Table 6.

TABLE 6

Pour point reduction observed for the various flow improvers evaluated: varying the styrene:maleic anhydride ratio in the backbone of the polymeric alkyl esters

| POUR POINT DEPRESSANT (PPD) | Reduction in Pour Point (° C.) 200 ppm PPD added | Reduction in Pour Point (° C.) 400 ppm PPD added |
|---|---|---|
| PSMA - I32* | 2 | 2 |
| PSMA - 70% I32 | 11 | 16 |
| PSMA - 50% I32 | 12 | 18 |
| PSMA - 30% I32 | 11 | 15 |
| PSMA - 24+** | 7 | 8 |
| COMM - I32* | 2 | 3 |
| COMM - 70% I32 | 7 | 10 |
| COMM - 50% I32 | 9 | 15 |
| COMM - 30% I32 | 11 | 15 |
| COMM - 24+** | 10 | 12 |

PSMA = Styrene-maleic anhydride copolymer containing 50 mol % maleic acid dialkyl ester
COMM = Styrene-maleic anhydride copolymer containing 33 mol % maleic acid di alkyl ester; as starting material Xiran ® (from Polyscope used as received) was used.
*Polymeric alkyl esters containing mainly branched alkyl chains (see characterization of flow improvers evaluated above)
**Polymeric alkyl esters containing mainly linear alkyl chains (see characterization of flow improvers evaluated above)

The results from table 6 show that increasing the ratio of ester groups in the polymer, respectively maleic acid diester groups, from 33 mol % (COMM) to 50 mol. % results in an slight or no increase of pour point reduction. For instance PSMA-70% I32 (50 mol % maleic acid diester groups) exhibited a reduction of 11° C. (200 ppm polymer as 40 wt. % solution in xylene applied), whereas COMM-70% I32 (33 mol % maleic acid diester groups) exhibited a reduction of 7° C. It was found that varying the maleic acid diester groups ratio between 33 mol % and 50 mol % had only a minor influence.

Example 4

The performance of additives obtained by different preparation methods was compared. PSMA-70% I32, PSMA-50% I32 and PSMA-30% I32 were prepared according to the general preparation method by pre-mixing the alcohols in the appropriate ratio before esterification, whereas PSMA-70% I32 blend, PSMA-50% I32 blend and PSMA-30% I32 blend were prepared by synthesizing first the PSMA-I32 and PSMA-24+ separately according to the general preparation method, and subsequently mixing the compounds in the appropriate ratios (see characterisation of flow improvers evaluated above). The results obtained on pour point reduction when the additives were added in 200 and 400 ppm polymer quantities (the polymer was added as a 40 wt. % solution in xylene), to Model Oil 1, is shown in Table 7.

TABLE 7

Pour point reduction observed for the various flow improvers evaluated: varying the preparation method of the polymeric alkyl esters

| POUR POINT DEPRESSANT (PPD) | Reduction in Pour Point (° C.) 200 ppm PPD added | Reduction in Pour Point (° C.) 400 ppm PPD added |
| --- | --- | --- |
| PSMA - I32 | 2 | 2 |
| PSMA - 70% I32 | 11 | 16 |
| PSMA - 70% I32 blend | 9 | 13 |
| PSMA - 50% I32 | 12 | 18 |
| PSMA - 50% I32 blend | 12 | 14 |
| PSMA - 30% I32 | 11 | 15 |
| PSMA - 30% I32 blend | 11 | 15 |
| PSMA - 24+ | 7 | 8 |

The results as reflected in the table above do not indicate significant differences associated with the different preparation methods.

Example 5

In order to determine whether the structure of the alkyl chains (branched, linear or a mixture of branched and linear chains) incorporated in the polymeric alkyl esters affects the ability of the additives to lower the pour point of paraffinic fluids, additives were prepared according to the general method described above. The polymers were added to Model Oil 2 in both 200 and 400 ppm polymer quantities (the polymer was added as a 40 wt. % solution in xylene), and their ability to reduce the pour point of the oil was determined. Results are shown in Table 8.

The results in Table 8 show that PPDs with mixed (linear and branched) alkyl esters (PSMA-70% I32, PSMA-50% I32 and PSMA-30% I32) show significantly higher pour point reduction values in Model Oil 2 than PPDs with either only linear alkyl chains (PSMA-24+) or only branched alkyl chains (PSMA-I32).

For Model Oil 2 the 30% mixture of branched ester groups (PSMA-30% I12) in the polymer delivered the best results.

TABLE 8

Pour point reduction observed for the various flow improvers evaluated: varying the branched/linear structure of the alkyl chains within the polymeric alkyl esters

| POUR POINT DEPRESSANT (PPD) | Reduction in Pour Point (° C.) 200 ppm PPD added | Reduction in Pour Point (° C.) 400 ppm PPD added |
| --- | --- | --- |
| PSMA - I12 | 1 | 2 |
| PSMA - 70% I12 | 4 | 4 |
| PSMA - 50% I12 | 11 | 20 |
| PSMA - 30% I12 | 18 | 23 |
| PSMA - I24 | 1 | 2 |
| PSMA - 70% I24 | 1 | 3 |
| PSMA - 50% I24 | 9 | 16 |
| PSMA - 30% I24 | 15 | 22 |
| PSMA - I32 | 1 | 1 |
| PSMA - 70% I32 | 5 | 6 |
| PSMA - 50% I32 | 10 | 17 |
| PSMA - 30% I32 | 14 | 22 |
| PSMA - 24+ | 14 | 13 |
| PSMA -N1822 | 6 | 11 |

PSMA = Styrene-maleic anhydride copolymer containing 50 mol % maleic acid dialkyl ester
*Polymeric alkyl esters containing mainly branched alkyl chains (see characterization of flow improvers evaluated above)
**Polymeric alkyl esters containing mainly linear alkyl chains (see characterization of flow improvers evaluated above)

FIG. 3 shows the effect of selected flow improvers on the viscosity of Model Oil 2 at various temperatures (200 ppm additive added).

The addition of the branched copolymer (PSMA-I32) to the Model Oil 2, whether as mixtures with the linear alkyl chain ester PSMA-24+(i.e. PSMA-70% I32, PSMA-50% I32 and PSMA-30% I32) or on its own, as well as the linear alkyl chain ester (PSMA-24+), showed low viscosities for the specific oil tested over a wide temperature range.

Example 6

The same mixtures of alcohols as described in Example 2 were used to synthesise polymeric additives according to the general method as described above. Each compound was added in 200 and 400 ppm polymer quantities (the polymer was added as a 40 wt. % solution in xylene) to Model Oil 2, and the pour point reduction was recorded. Results are shown in Table 9.

TABLE 9

Pour point reduction observed for the various flow improvers evaluated: varying the structure of the alkyl chains incorporated into the compounds

| POUR POINT DEPRESSANT (PPD) | Reduction in Pour Point (° C.) 400 ppm PPD added |
| --- | --- |
| PSMA-I32 | 1 |
| PSMA-70% I32/30% 24+ | 6 |
| PSMA-50% I32/50% 24+ | 17 |
| PSMA-30% I32/70% 24+ | 22 |
| PSMA-24+ | 13 |

Mixed success with regard to pour point reduction was obtained. For Model Oil 2 it seems as if better results were obtained when mixing ISOFOL 32 with NAFOL24+ to obtain an alcohol blend for esterification of the polymeric compound. These results further illustrate the need to optimise the design of the polymeric additives for the specific nature of the paraffinic compound that will be used together with the pour point depressants.

Example 7

In order to determine whether the ratio between styrene and maleic acid dialkyl ester in the polymeric backbone of the ester, plays a role in the ability of the ester to lower the pour point of the paraffinic oil, polymeric alkyl esters were prepared according to the general method described above. The molar ratio of styrene:maleic acid dialkyl ester was varied between 50:50 and 67:33. The esters were added to Model Oil 2 in both 200 and 400 ppm polymer quantities (the polymer was added as a 40 wt. % solution in xylene), and their ability to reduce the pour point of the oil was determined. Results are shown in Table 10.

TABLE 10

Pour point reduction observed for the various flow improvers evaluated: varying the styrene:maleic anhydride mol ratio in the backbone of the polymeric alkyl esters

| POUR POINT DEPRESSANT (PPD) | Reduction in Pour Point (° C.) 400 ppm PPD added |
|---|---|
| PSMA - I32 | 1 |
| PSMA - 70% I32 | 6 |
| PSMA - 50% I32 | 17 |
| PSMA - 30% I32 | 22 |
| PSMA - 24+ | 13 |
| PSMA-N1822 | 11 |
| COMM - I32 | 3 |
| COMM - 30% I32 | 25 |
| COMM 24+ | 20 |
| COMM - N1822 | 4 |

PSMA = Styrene-maleic anhydride copolymer containing 50 mol % maleic acid dialkyl ester
COMM = Styrene-maleic anhydride copolymer containing 33 mol % maleic acid dialkyl ester
* Polymeric alkyl esters containing mainly branched alkyl chains (see characterization of flow improvers evaluated above)
** Polymeric alkyl esters containing mainly linear alkyl chains (see characterization of flow improvers evaluated above)

The results from table 10 show that increasing the ratio of ester groups in the polymer respectively maleic acid diester groups from 33 mol % (COMM) to 50 mol. % results in a slight or no increase of pour point reduction. For instance PSMA-30% I32 (50 mol % maleic acid diester groups) exhibited a reduction of 22° C. (400 ppm polymer as 40 wt. % solution in xylene applied), whereas COMM-30% I32 (33 mol % maleic acid diester groups) exhibited a reduction of 25° C. It was found that varying the maleic acid diester groups ratio between 33 mol % and 50 mol % had only a minor influence.

Example 8

The performance of additives obtained by different preparation methods was compared. PSMA-70% I32, PSMA-50% I32 and PSMA-30% I32 were prepared according to the general preparation method by pre-mixing the alcohols in the appropriate ratio before esterification, whereas PSMA-70% I32 blend, PSMA-50% I32 blend and PSMA-30% I32 blend were prepared by synthesizing first the PSMA-I32 and PSMA-24+ separately according to the general preparation method, and subsequently mixing the compounds in the appropriate ratios (see characterization of flow improvers evaluated above). The results obtained on pour point reduction when the additives were added in 200 and 400 ppm polymer quantities (the polymer was added as a 40 wt. % solution in xylene) to Model Oil 2, is shown in Table 11.

TABLE 11

Pour point reduction observed for the various flow improvers evaluated: varying the preparation method of the polymeric alkyl esters

| POUR POINT DEPRESSANT (PPD) | Reduction in Pour Point (° C.) 200 ppm PPD added | Reduction in Pour Point (° C.) 400 ppm PPD added |
|---|---|---|
| PSMA - I32 | 1 | 1 |
| PSMA - 70% I32 | 5 | 6 |
| PSMA - 70% I32 blend | 25 | 27 |
| PSMA - 50% I32 | 10 | 17 |
| PSMA - 50% I32 blend | 26 | 34 |
| PSMA - 30% I32 | 14 | 22 |
| PSMA - 30% I32 blend | 26 | 32 |
| PSMA - 24+ | 14 | 13 |

The results reported in table 11 (referring to model oil 2) show improved pour point reduction for cases where the branched alcohols used for esterification was not pre-mixed with the linear alcohol. Linear alkyl-chain polymeric esters were therefore afterwards mixed with branched alkyl chain polymeric esters, which led to improved pour point reduction abilities when compared to the esters prepared from premixed linear and alkyl chains.

The polymeric additives of the present invention may also comprise in their backbone up to 10% other building blocks such as (meth)acrylates. Further, polymeric additives of the present invention may be mixed with alternative polymeric additives so that up to 10 mol % alternative building blocks are present.

The invention claimed is:
1. A method for reducing the pour point of a paraffin-containing fluid, comprising adding to a paraffin-containing fluid a polymer comprising the following building blocks:

a)

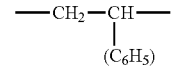

b)

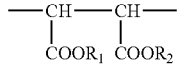

wherein
and —$R_2$ are, independent from each other, a C12- to C36- alkyl group;
the alkyl groups being a mixture of branched and linear, the ratio of the linear alkyl groups to the branched alkyl groups is in the range from 95:5 to 5:95 (weight % : weight %),
at least 90% of the number of the building blocks are a) and b), relative to the total number of all building blocks incorporated in the polymer; and
the building blocks a) and b) are, relative to each other, present in the polymer in a ratio of from 80:20 to 20:80 (number:number);
wherein the paraffin-containing fluid is a crude oil, a petroleum oil, a shale oil, a tar sands oil, or mixtures thereof; and
wherein 20 to 2000 ppm (weight:weight) of the polymers are used in the paraffin-containing fluid.
2. The method according to claim 1, wherein the polymer consists of more than 98% of the building blocks a) and b).

3. The method according to claim 1, wherein the branched alkyl groups are 2-alkyl-1-alkyl groups.

4. The method according to claim 1, wherein the branched to linear ratio of the alkyl chains is from 10:90 to 90:10 (weight % : weight %).

5. The method according to claim 1, wherein the ratio of the number of building blocks a) and b) is from 75:25 to 50:50.

6. The method according to claim 1, wherein the polymers have an acid value of less than 2 mg KOH/g, measured according to DIN EN 14104.

7. The method according to claim 1, wherein the polymers comprise in total 50 to 150 building blocks a) and b) per polymer chain.

8. The method according to claim 1, wherein 100 ppm to 2000 ppm (weight:weight) of the polymers are used in the paraffin-containing fluid.

9. The method according to claim 1, wherein the polymer is used as being part of a liquid composition, comprising
(A) 1 to 50 wt. % of the polymers, dissolved in
(B) 99 to 50 wt. % of an aromatic solvent,
each relative to the total weight of (A) and (B).

* * * * *

UNITED STATES PATENT AND TRADEMARK OFFICE
CERTIFICATE OF CORRECTION

PATENT NO. : 11,441,095 B2
APPLICATION NO. : 15/747061
DATED : September 13, 2022
INVENTOR(S) : Oliver Herzog et al.

Page 1 of 1

It is certified that error appears in the above-identified patent and that said Letters Patent is hereby corrected as shown below:

In the Specification

Column 2, Line 42:
"R1, -R2 = are independent" should read -- -R1, -R2 = are independent --

In the Claims

Column 16, Line 49:
Please add -- -R1 -- before "and -R2"

Signed and Sealed this
Tenth Day of October, 2023

Katherine Kelly Vidal
*Director of the United States Patent and Trademark Office*